US007286834B2

(12) United States Patent
Walter (10) Patent No.: US 7,286,834 B2
(45) Date of Patent: Oct. 23, 2007

(54) SYSTEM AND METHOD FOR LOCATION BASED POLICY MANAGEMENT

(75) Inventor: Edward Walter, Boerne, TX (US)

(73) Assignee: SBC Knowledge Ventures, LP, Reno, NV (US)

( * ) Notice: Subject to any disclaimer, the term of this patent is extended or adjusted under 35 U.S.C. 154(b) by 128 days.

(21) Appl. No.: 10/890,397

(22) Filed: Jul. 13, 2004

(65) Prior Publication Data
US 2006/0014547 A1 Jan. 19, 2006

(51) Int. Cl.
H04Q 7/20 (2006.01)
(52) U.S. Cl. ................... 455/456.1; 455/456.3
(58) Field of Classification Search ........... 455/411, 455/422.1, 440, 456.1, 456.3
See application file for complete search history.

(56) References Cited

U.S. PATENT DOCUMENTS

| 5,850,444 | A | 12/1998 | Rune |
| 6,178,506 | B1 | 1/2001 | Quick, Jr. |
| 6,236,852 | B1 | 5/2001 | Veerasamy et al. |
| 6,813,501 | B2 * | 11/2004 | Kinnunen et al. ....... 455/456.2 |
| 6,907,254 | B1 | 6/2005 | Westfield |
| 2003/0017826 | A1 * | 1/2003 | Fishman et al. ............ 455/426 |
| 2003/0118015 | A1 * | 6/2003 | Gunnarsson et al. ........ 370/389 |
| 2003/0207683 | A1 * | 11/2003 | Lempio et al. .......... 455/422.1 |
| 2003/0220116 | A1 * | 11/2003 | Sagefalk et al. ......... 455/456.1 |
| 2004/0014422 | A1 * | 1/2004 | Kallio ....................... 455/41.1 |
| 2004/0162084 | A1 * | 8/2004 | Wang ...................... 455/456.1 |
| 2004/0166901 | A1 * | 8/2004 | Umesh et al. .............. 455/561 |
| 2005/0260972 | A1 * | 11/2005 | Karaoguz et al. ........... 455/406 |
| 2005/0260996 | A1 * | 11/2005 | Groenendaal ............... 455/445 |
| 2006/0264211 | A1 * | 11/2006 | Kalhan et al. .............. 455/425 |

FOREIGN PATENT DOCUMENTS

WO WO 2004/028070 A1 4/2004

* cited by examiner

Primary Examiner—Duc M. Nguyen
Assistant Examiner—Michael Thier
(74) Attorney, Agent, or Firm—Toler Schaffer, LLP (57) ABSTRACT

The disclosure is directed to a system including a set of short-range wireless access points and a policy server. The set of short-range wireless access points are configured to provide a short-range wireless network having a coverage area and are configured to communicate with a wireless enabled device within the coverage area. The policy server is communicatively coupled with the set of short-range wireless access points and is configured to determine whether the wireless enabled device is located within a designated region within the coverage area based on data received from the set of short-range wireless access points.

11 Claims, 8 Drawing Sheets

FIG. 13

SYSTEM AND METHOD FOR LOCATION BASED POLICY MANAGEMENT

FIELD OF THE DISCLOSURE

This disclosure, in general, relates to systems and methods for location based policy management.

BACKGROUND

Short-range wireless data networks have become commonplace, being found in homes, coffee shops, and places of business. Short-range wireless standards, such as 802.11x, and to some extent Bluetooth, provide network users with mobility and easy network access. However, this ease of wireless network access poses problems to network administrators including securing network traffic and preventing unauthorized network access.

Manufacturers of short-range wireless equipment have attempted to address the security issues posed by intrusive and unauthorized traffic through protocols, such as wireless application protocol (WAP), and encryption mechanisms such as wired equivalent privacy (WEP) and Wi-Fi protected access (WPA). The WAP protocol, for example, provides services for wireless devices that include security layers, such as wireless transport layer security (WTLS), that are designed to provide privacy, data integrity and authentication between communicating applications. WEP is an algorithm used to protect wireless communications from eavesdropping through data encryption. WEP relies upon a key that is shared between a mobile station and an access point. The key is used to encrypt packets before they are transmitted, and an integrity check is used to verify that the packets are not modified in transit. WPA is a security enhancement for Wi-Fi networks that defines the use of the advance encryption standard (AES) as an additional replacement for WEP encryption.

However, even with these security methods and mechanisms, wireless networks tend to extend beyond traditional physical boundaries, allowing users outside the boundaries to gain unauthorized access to networks. As such, improved systems and methods for managing access to short-range wireless networks would be desirable.

DESCRIPTION OF THE DRAWING(S)

In a particular embodiment, the disclosure is directed to a method of controlling network traffic including providing boundary data defining a boundary zone within a short-range wireless network coverage area, determining whether a wireless enabled device is located within the boundary zone, and controlling network traffic received from the wireless enabled device when the wireless enabled device is located outside the boundary zone.

In another embodiment, the disclosure is directed to a policy server including a processor, communication circuitry, and memory. The communication circuitry is accessible to the processor and is configured to connect to a set of wireless network access points. The set of wireless access points provide a short-range wireless network coverage area. The memory is accessible to the processor and includes boundary data and computer-implemented instructions operable by the processor to determine whether a wireless enabled device is located within a boundary zone within the coverage area based on data received from the set of wireless network access points. The boundary zone is defined by the boundary data.

In a further embodiment, the disclosure is directed to a communications device including long-range wireless communication circuitry configured to access a long-range wireless network, short-range wireless communication circuitry configured to access a short-range wireless network, configurable feature circuitry, and a feature policy driver. The feature policy driver is programmed to receive a feature policy via the short-range wireless communication circuitry and is programmed to configure the feature circuitry based on the feature policy.

In another embodiment, the disclosure is directed to a method for managing feature functionality of a wireless enabled device. The method includes providing boundary data defining a boundary zone within a short-range wireless network coverage area, determining whether a wireless enabled device is located within the boundary zone, and determining a feature policy to be applied to the wireless enabled device based on determining whether the wireless enabled device is located within the boundary zone.

In a particular embodiment, the disclosure is directed to a system including a set of access points and a policy server. The set of access points establish a coverage area for a short-range wireless network and provide data to the policy server regarding wireless devices within the coverage area. The policy server determines the location of the wireless devices and whether the wireless devices are located within a boundary zone. Based on the location of the wireless device or its location within or outside of the boundary zone, a policy, such as a network traffic policy or a feature policy, may be applied to the wireless devices or network traffic transmitted by the network device. For example, network traffic policies may define network access and network access parameters based on wireless enabled device location. Feature policies may manipulate device features and feature availability based on wireless enabled device location.

Figure 1:
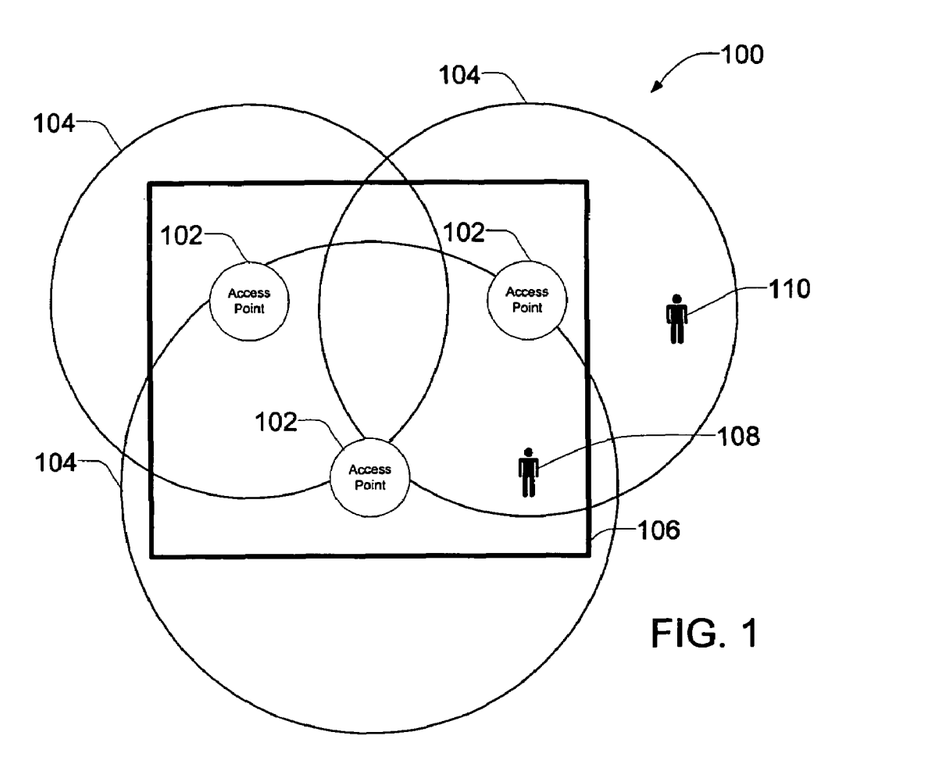
FIGS. 1, 2, 3 and 4 are general diagrams that depict an exemplary short-range wireless network.

FIG. 1 illustrates an exemplary short-range wireless network. The exemplary short-range wireless network 100 includes a set of access points 102 that each provide portions 104 of a coverage area. Typically, the coverage area portions 104 may extend beyond traditional physical boundaries or desired access areas. In this exemplary embodiment, the coverage area portions 104 extend beyond a physical boundary 106, such as a building, a room, an office space, a residence, or a shop location. In other examples, the boundaries or desired access areas 106 may include conceptual regions such as patios, balconies, reception areas, gardens, and parks.

The nature of the short-range wireless network is such that individuals having wireless enabled devices located within the portions 104 of the short-range wireless network coverage area may receive signals from one or more of the access points 102. An individual within a preferred access area, such as a user 108, may receive data emitted by the access points 102. In addition, a user located outside the preferred access area, such as user 110, may also receive data transmitted from the access points 102.

In exemplary embodiments, the access points 102 may provide a short-range wireless network using standards and protocols, such as Wi-Fi, Wi-Max, Institute of Electrical and Electronics Engineers (IEEE) 802.11x, IEEE 802.15, IEEE 802.16, and Bluetooth. A short-range wireless network may, for example, have an effective coverage area portion provided by an access point, wherein the effective coverage area does not exceed 1000 feet in radius, such as not greater than 200 feet, or not greater than about 50 feet in radius. The short-range wireless network may, for example, provide wireless data network access in proximity to the access points, such as in and around a building, room, residence, office space, shop, or preferred access area. Wireless devices accessing the short-range wireless network may include wireless enabled computational devices, such as portable commuters, printers, handheld computational devices, portable digital assistants (PDAs), wireless data network enabled cellular telephones, and other networkable devices. In general, a short-range wireless network is not a cellular or pager based network and is an internet protocol (IP) based wireless data network. In contrast, long-range wireless networks generally provide wireless networks having a radius greater than about 1000 feet. For example, long-range wireless networks include pager networks and cellular telephone networks, such as time division multiple access (TDMA), code division multiple access (CDMA), and global system for mobile communication (GSM) networks.

Figure 2:
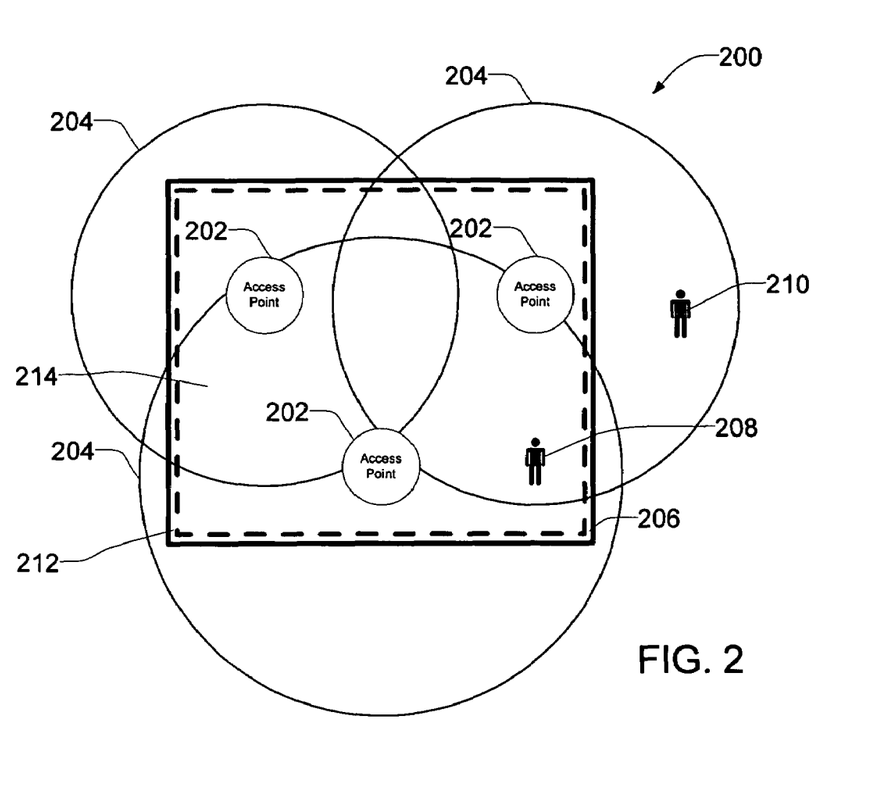

FIG. 2 depicts an exemplary short-range wireless network 200 that includes a set of wireless network access points 202 that each provide portions 204 of a wireless network coverage area. Users having wireless enabled devices such as users 208 and 210 may be located within the coverage area portions 204 and, as such, may receive network transmissions transmitted from access points 202. A boundary 212 that defines a boundary zone 214 may be established for policy management, such as network traffic policies and feature policies. For example, a server or other network equipment may include boundary data that defines the boundary zone 214 and the boundaries 212. In this exemplary embodiment the boundary zone 214 corresponds closely with a preferred access area such as a room or building 206.

The location of a wireless enabled device may be determined using data from the access points. In one exemplary embodiment, a triangulation method uses at least three access points. For example, location may be determined by evaluating timing data associated with a signal reaching several access points. Network equipment such as a server or router device may include instructions for determining location based on timing data provided by the access points. In another exemplary embodiment, the triangulation method may use relative power levels of wireless communications received either at the wireless device or at the access points. The network equipment may determine the location relative to the access points based on these power measurements. In alternative embodiments, methods may be employed such as power measurement methods to determine location using one or two access points.

The network equipment may use data from the access points 202 to determine whether wireless devices, such as those co-located with users 208 and 210 are located within the boundary zone 214. In one exemplary embodiment, the network equipment utilizes triangulation methods based on at least three access points 202 to determine the location of a user and whether the user is located within the boundary 212 or the boundary zone 214. Using this determination, the network equipment may determine and implement policies associated with the location of the mobile device, the device's traffic, and/or device features. For example, a user having a wireless device, such as user 208, located within the boundary zone 214 may be provided with or associated with a policy different than a user located outside the boundary zone 214, such as user 210. For example, user 208 located within the boundary zone 214 may be provided with differing security and network traffic controls than user 210 located outside the boundary zone. In another exemplary embodiment the user 208 located within the boundary zone 214 may be provided with one feature policy while a user device 210 located outside of the boundary zone 214 may be provided with a second feature policy.

While FIG. 2 depicts a single boundary zone 214, alternative systems may include multiple boundary zones. Boundary data may be used to establish more than one boundary zone. In addition, systems having multiple boundary zones may apply different policies to wireless devices located within different boundary zones or different policies to the same wireless enabled device as it traverses the multiple boundary zones. In this manner, the system may implement multiple policy areas or a policy mapping.

Figure 3:
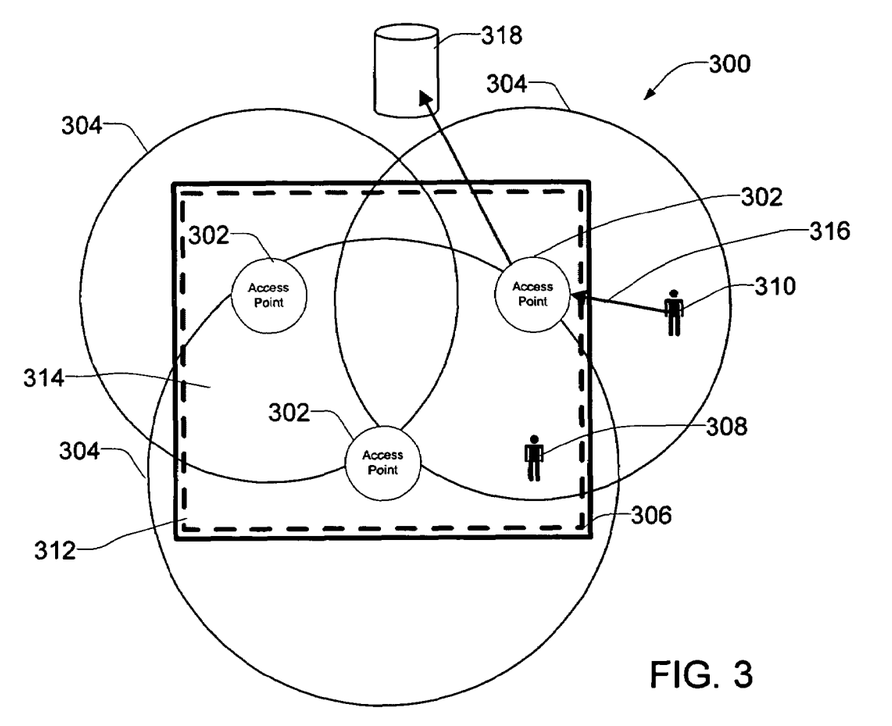

In one exemplary embodiment, users located outside of the preferred access zone as defined by the boundary zone may be denied network access. FIG. 3 illustrates an exemplary short-range wireless network 300 that implements location based network management. The short-range wireless network 300 may include wireless access points 302 that each provide a portion 304 of a coverage area. Within the coverage area, a boundary 312 may define a boundary zone 314 that represents a preferred access area. In this exemplary embodiment, the preferred access area and boundary zone 314 are located within a physical structure 306. For example, a preferred access region may be located within a building, a room, a residence, an office space, a shop or a patio region. In this exemplary embodiment, wireless enabled devices located within the boundary zone 314, such as devices co-located with user 308 may be provided with network access. For example, the set of access points 302 may provide data to network equipment, such as a server or router that determines the location of the user and determines whether the user is within the boundary zone 314. Network packets provided to and received from the wireless device associated with the user 308 may be transmitted across the wireless network and may be given access to external wired networks. In contrast, wireless enabled devices located outside of the boundary zone 314, such as devices co-located with user 310, may be denied access to the network. For example, network equipment may determine the location of the user 310 based on data from a set of access points 302. Using this location determination, data packets 316 transmitted from the wireless device 310 located outside of the boundary zone 314 may be dropped, discarded, sent to a holding place or trash 318, or treated with policies and algorithms differing from those applied to a wireless device located within the boundary zone 314.

Figure 4:
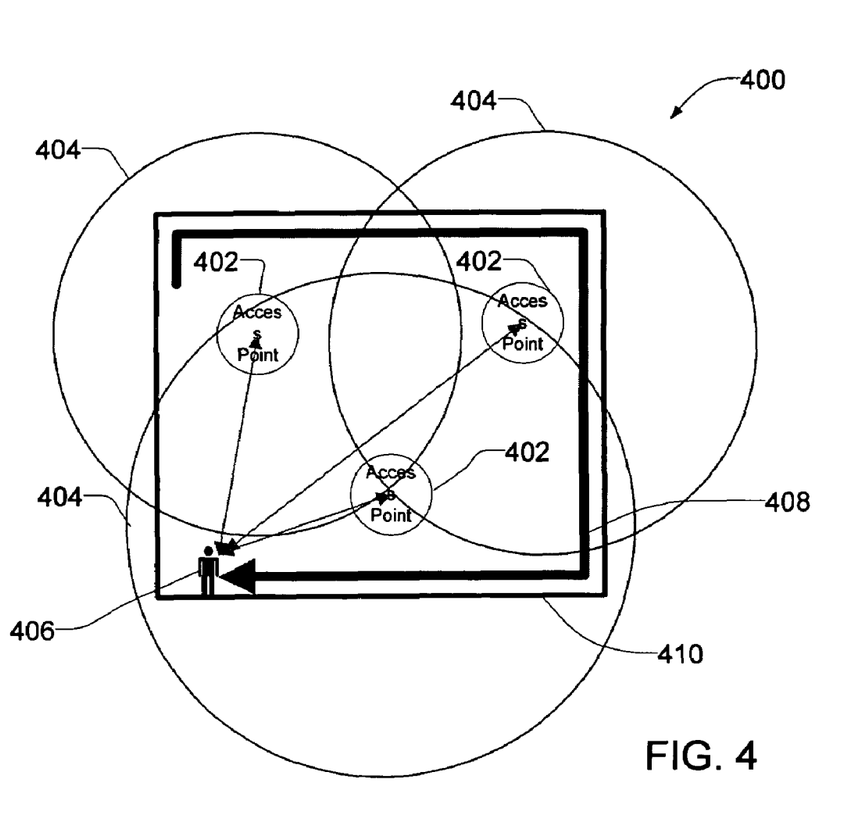

FIG. 4 illustrates another exemplary short-range wireless network 400 that includes a set of wireless access points 402 that each provide portions 404 of a wireless network coverage area. In one exemplary embodiment, a boundary and a boundary zone may be established using a set of locations within a coverage area. These locations may be used to establish the boundary and boundary zones, such that they conform closely to a preferred access area or region. In one exemplary embodiment, the user 406, having a wireless enabled calibration device, may provide boundary data to network equipment by calibrating at various points along a boundary path 408. In the exemplary embodiment depicted, the boundary path 408 closely conforms to the physical boundary of a room or building. In alternative examples, the calibration device may provide a set of points from which a boundary may be extrapolated. For example, two boundary points may be used to create a boundary line or a set of boundary measurements, such as power measurements may be used to create a statistical boundary zone or area.

In one exemplary embodiment, boundary data and locations may be determined by triangulation between at least three access points. A set of triangulated boundary points may be compared to locations of devices in the coverage area to determine whether the devices are located within a boundary zone. Using this determination, differing network access policies and feature policies may be applied to mobile wireless enabled device.

Figure 5:
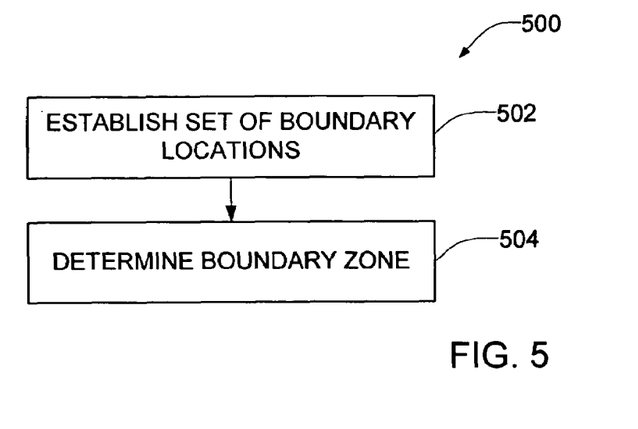
FIG. 5 is a flow diagram that illustrates an exemplary method for defining a wireless boundary region.

FIG. 5 depicts an exemplary method 500 for providing a boundary zone. As shown at step 502, a set of boundary locations is established. For example, a wireless calibration device may communicate with network equipment to establish a set of locations along a boundary. This set of locations may be converted to boundary data that defines a boundary zone. In this manner, the boundary zone is determined, as shown at step 504.

Figure 6:
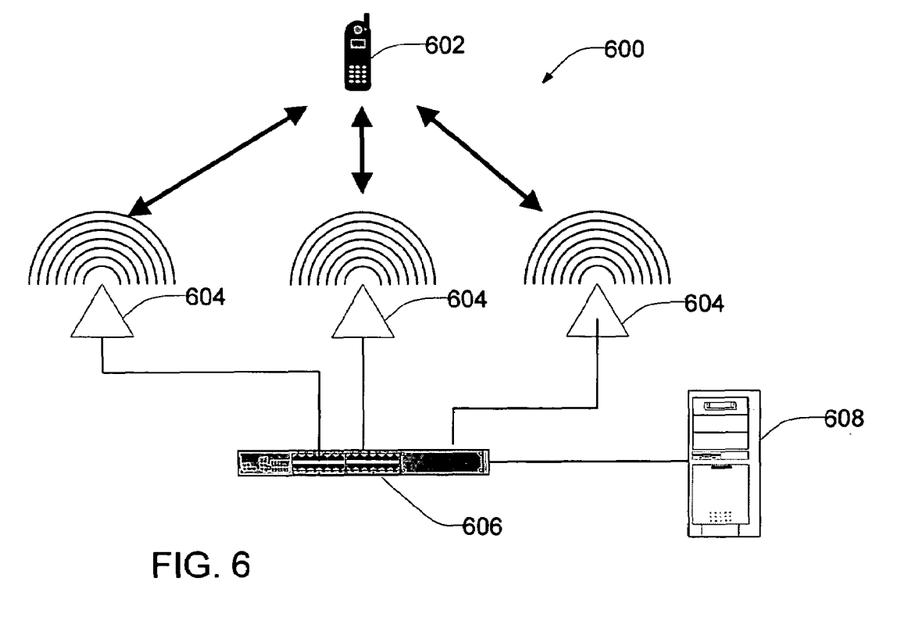
FIGS. 6 and 7 are general diagrams that depict exemplary computer systems for providing a short-range wireless network.

FIG. 6 depicts an exemplary system 600 for establishing a short-range wireless network. A device 602, such as a wireless hand-held electronic device, a wireless enabled laptop or a short-range wireless enabled cell phone, may interact with access points 604 when located within the coverage area of the short-range wireless network. The access points 604 collect data associated with the location to the wireless device 602 and transfer that data via a router or other network equipment 606 to a policy sewer 608. For example, the access points 604 may record a time that a signal was received. This signal arrival time may be transferred to the policy sewer 608 and the policy server 608 may determine the location of the wireless device within a coverage area based on the reported signal arrival times from each access point 604. The policy server 608 compares the location with boundary zone data to determine whether the wireless device 602 is located within a boundary zone. The policy server 608 implements and associates policies with the wireless device 602 based on its location relative to a boundary zone. For example, the policy server may implement network traffic controls based on the location of the wireless device 602. In one exemplary embodiment, the policy server 608 manipulates network equipment, such as network equipment 606, to control network traffic received from the wireless device 602. In one example, network traffic received from the wireless device 602 when the wireless device 602 is located within a boundary zone is permitted to pass to external networks. In another example, network packets transmitted from the wireless device 602 when the wireless is outside of a boundary zone are dropped or discarded. In another exemplary embodiment, the policy server 608 may implement additional security protocols for devices accessing the network based on their location relative to the boundary zone. For example, a policy server may implement a network that uses different encryption protocols or different security keys based on the location of the wireless device.

In another embodiment, the policy server 608 may interact with the wireless device 602 and control its features and feature activation based on the location within the coverage area. For example, if wireless device 602 is a short-range wireless enabled cellular telephone, the policy server 608 may interact with the cellular telephone to manipulate features located on the cellular telephone based on the phone's location. For example, the policy server may manipulate ring tones, ring volume and vibration modes on a cellular telephone based on the cellular telephone's location. In another exemplary embodiment, the policy server manipulates or deactivates camera features on a camera enabled cellular telephone based on its location within the coverage area. Additional exemplary features and feature policies are described below.

Figure 7:
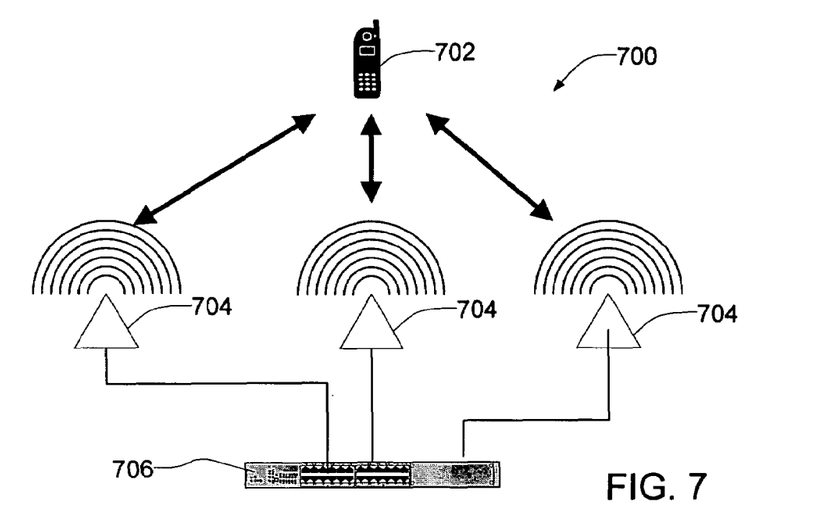

FIG. 7 depicts an alternate embodiment of a system where a policy server is implemented within network equipment. The system 700 includes a set of access points 704 connected to network equipment 706. The access points 704 interact with the wireless device 702 to gather data that may be used in determining the wireless device location. The network equipment 706 uses this data to determine the location of the wireless device. Using the location, the network equipment may compare the location of the wireless device to boundary zone data to determine the location of the device relative to the boundary zone. In response, the network equipment may implement policies, such as network traffic controls and feature policies, based on the relative location of the device 702 to a boundary zone.

Figure 8:
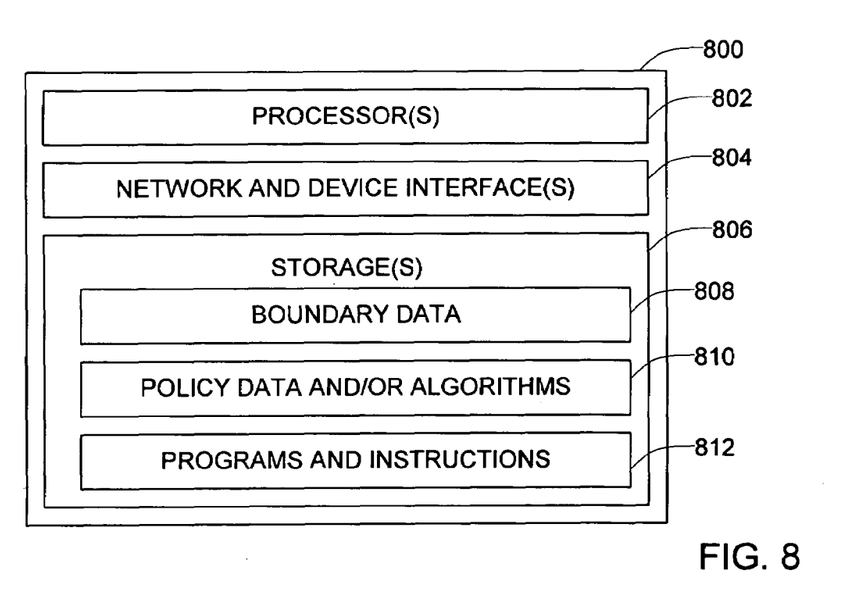
FIG. 8 is a block diagram depicting an exemplary policy server.

FIG. 8 depicts an exemplary policy server 800. The policy server 800 may be a separate computational system or may be implemented within other data network equipment. The policy server includes processors 802, network and device interfaces 804, and storage 806, such as memory. The storage or memory 806 includes boundary data 808 and programs and instructions 812, and may include policy data and/or algorithms 810.

The network and device interfaces 804 interact with access points and network equipment. For example, the network and device interfaces 804 include interfaces to a wired network and interfaces to access points that implement a wireless short-range wireless network. Through this interaction with the access points, data associated with the location of a wireless device are transferred to the policy server 800.

Programs and instructions 812 are operable by the processors 802 to determine the location of the wireless device within the short-range wireless network coverage area based on the data received from the access points. For example, the programs and instructions 812 may include location determination logic. In addition, the program and instructions 812 may also include software instructions for comparing the location of the wireless device to boundary data 808. From this comparison, the system determines whether particular wireless devices are located within or outside of the boundary zone. The programs and instructions 812 may further include software instructions for implementing policies, such as network traffic controls and feature policies, based on the location of the wireless device. For example, software instructions 812, operable by the processors 802, may be configured to access policy data and algorithms 810 to determine selected policies to implement based on the relative location of the wireless device to a boundary zone. For example, the system 800 may implement network traffic controls based on the location of the wireless device. In another exemplary embodiment the system 800 may implement feature policy controls based on the location of the wireless device.

Figure 9:
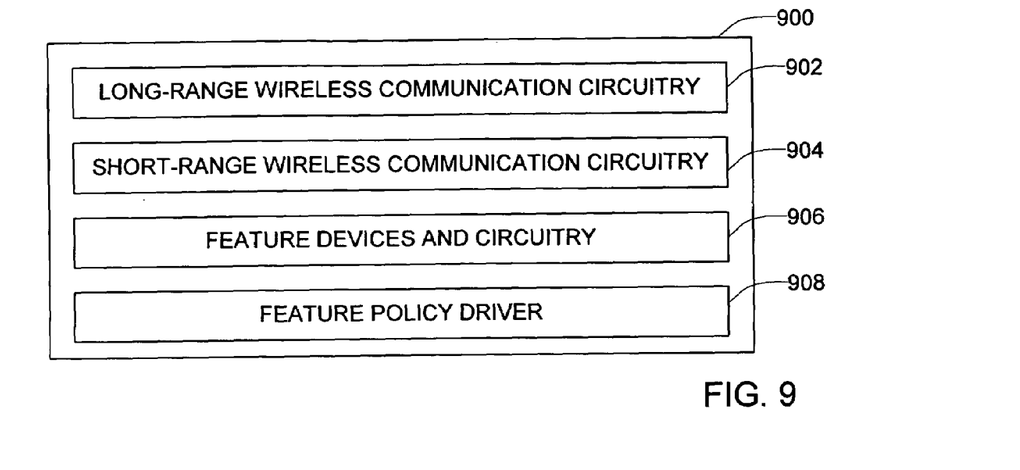
FIG. 9 is a block diagram depicting an exemplary wireless device.

In one particular embodiment, the wireless device may be implemented as a cellular telephone or portable hand-held device with cellular telephone functionality. In another exemplary embodiment, the wireless device may be configured to access both a long-range network, such as a pager or cellular network, and a short-range network. FIG. 9 depicts an exemplary device that includes both long distance communication circuitry 902 and short-range wireless communication circuitry 904. For example, the long-range communication circuitry 902 may be implemented as a cellular telephone transceiver. The short-range wireless communication circuitry 904 may, for example, interact with a short-range wireless network. In exemplary embodiments, the short-range wireless network includes networks utilizing protocols and standards, such as IEEE 802.11x, IEEE 802.15, IEEE 802.16, Bluetooth, Wi-Fi, and Wi-Max. In addition, to the communications circuitry 902 and 904, the device 900 includes feature devices and circuitry 906 and a feature policy driver 908. The feature devices and circuitry 906 may include circuitry that enables inbound calling, outbound calling, ringer volume levels, text messaging, voice alert messaging, camera features, web access features, application features, such as JAVA based application, games, voice-over-IP (VoIP). The feature policy driver 908 interacts with the feature devices and circuitry 906 to activate, enable, disable, deactivate or manipulate the parameters or policies associated with those devices and circuitry 906. For example, the feature policy driver 908 may deactivate a camera capability or web feature when a device is located within a boundary zone. In another example, the features policy driver 908 may activate or deactivate application environments such as JAVA application environments based on a location of the device relative to boundary zones. In a further example, the feature policy driver 908 may initiate downloading of applications.

In one exemplary embodiment, when the device 900 enters a coverage area of a short-range wireless network, short-range wireless communications circuitry 904 interacts with access points to establish a location of the wireless device 900. A policy server associated with the short-range wireless network determines a feature policy based upon the location of the wireless device within the coverage area relative to boundary zones or a policy mapping. The policy server transmits a feature policy to the device via the short-range wireless network. The feature policy driver 908 implements feature policies that manipulate the feature devices and circuitry 906. For example, the features policy server may transmit a feature policy that disables or deactivates camera features within camera enabled cell phones.

In one exemplary embodiment, a school may implement a policy that disables game features and JAVA-based applications within classrooms. In this example, the school may establish a short-range wireless network with boundary zones associated with classroom locations. When wireless enabled devices including a feature policy driver are located within the classroom boundary zones, features such as games, JAVA applications, cameras, and ringer volume may be manipulated, disabled or shut off. Similarly, an establishment may establish a boundary zone closely associated with restrooms and locker rooms. In such boundary zones, features such as cameras may be disabled. In a further exemplary embodiment, movie theaters may activate vibration or silent modes within theaters by applying feature policies to features policy enabled devices.

In another exemplary embodiment, a policy server may communicate with feature policy enabled devices utilizing voice alert messages and text alert messages. For example, the policy server may provide a text alert message indicating that the device is entering a restricted zone or that a certain feature policy will be enacted. A similar message may be provided by a voice alert. In a further example, features, such as voice over IP capabilities, may be enabled or disabled based on locations within the coverage area relative to the boundary zone.

Figure 10:
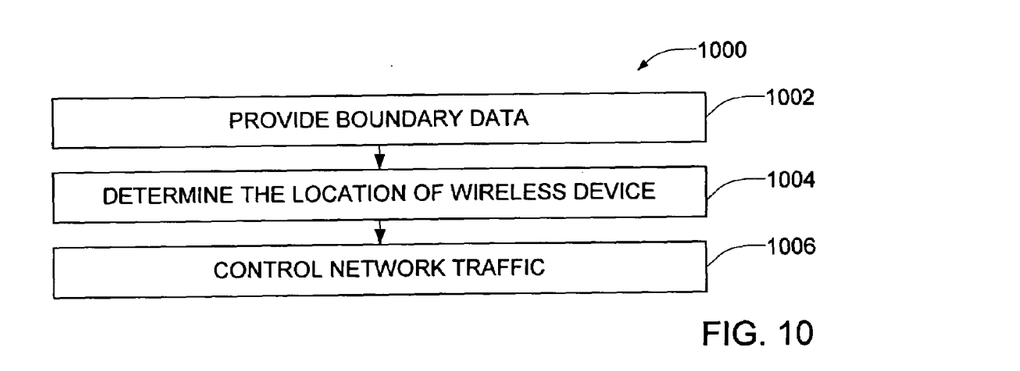
FIGS. 10 and 11 are flow diagrams illustrating exemplary methods for controlling network traffic.

FIG. 10 depicts an exemplary method 1000 for controlling network traffic. The method includes providing boundary data, as shown at step 1002. The boundary data may include a set of boundary locations that are used to establish a boundary zone or region. When a wireless device enters the short-range wireless network coverage area, the system determines the location of the wireless device, as shown at step 1004. For example, the system may use a dine-based triangulation technique utilizing at least three wireless access points. In another exemplary embodiment, the system may use a power-based technique for determining wireless device location. Determining the location of the wireless device may further include comparing a location to the boundary data to determine whether the location is within a boundary zone. Based on the location relative to the boundary zone, the system may control network traffic, as shown at step 1006. For example, the system may discard packets received from devices located outside of the boundary zone.

Figure 11:
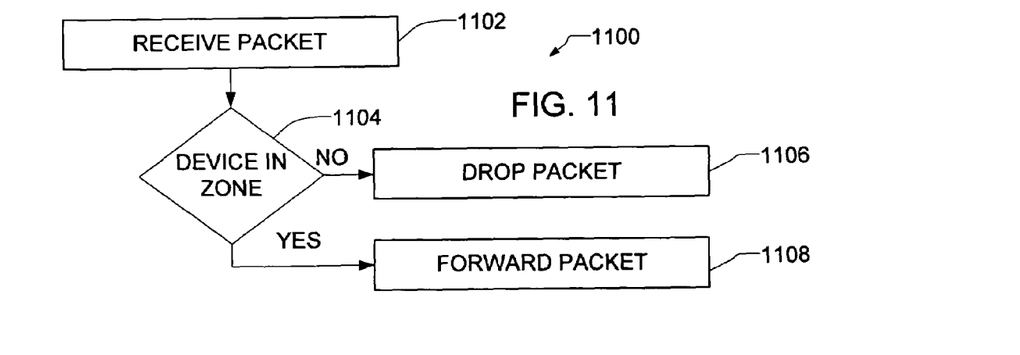

FIG. 11 depicts a method for controlling the network traffic. The method 1100 includes receiving a packet from a wireless device, as shown at step 1102. A determination is made as to whether the device is within the boundary zone or region, as shown at step 1104. For example, the system may periodically determine the location of the wireless device relative to the boundary zone. The system may, for example, set a flag that indicates whether the device is in or out of the boundary zone. This flag may be checked to determine whether a packet received from the device should be forwarded or discarded.

If the device is determined to be in the boundary zone, the packet is forwarded, as shown at step 1108. If the device is not within the boundary zone, the packet is dropped or discarded, as shown at step 1106.

Figure 12:
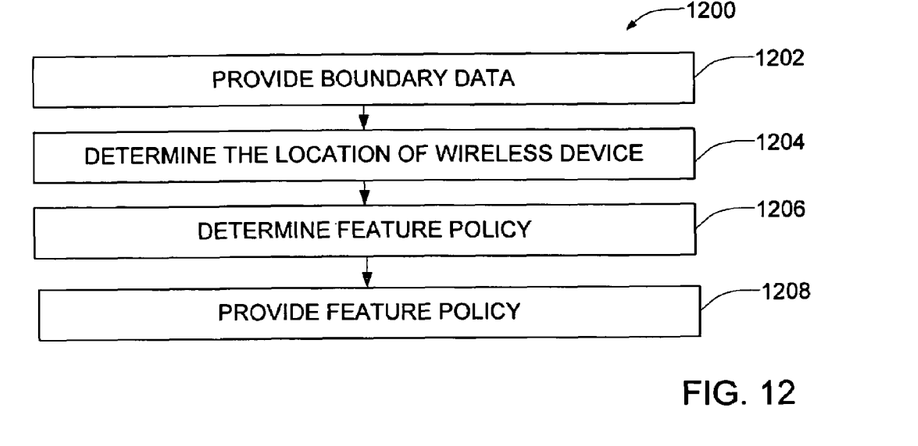
FIGS. 12 and 13 are flow diagrams illustrating exemplary methods for providing a feature policy.

Policies may also be implemented as feature policies that manipulate and control features of a device enabled to receive the feature policies, FIG. 12 depicts an exemplary method 1200 for controlling features policies. Boundary data is provided, as shown at step 1202. When a wireless device enters a coverage area to a short-range wireless network, the location of the wireless device is determined, as shown at step 1204. For example, the system may utilize a triangulation technique or a power-based technique to determine the location of the device. Determining the location of the device may further include comparing the location to the boundary data to determine the location of the device relative to a boundary zone Based on the location of the device relative to the boundary zone, the system determines a feature policy, as shown at step 1206. For example, one feature policy may apply to a device when it is located within a boundary zone and a second feature policy may apply to the device when it is located outside of the boundary zone. The system provides the location based feature policy to the wireless device, as shown at step 1208.

Figure 13:
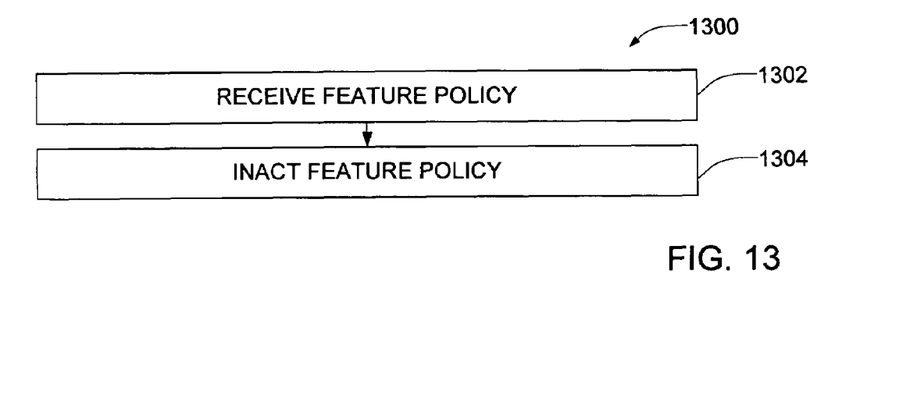

FIG. 13 depicts another exemplary method 1300 for controlling features policies. A device enabled to communicate via the short-range wireless network and including a feature policy driver, may receive the feature policy, as shown at step 1302 in FIG. 13. The feature policy may, for example, deactivate features, such as cameras. The feature policy driver on the device may enact the feature policy, as shown at step 1304. For example, the feature policy driver may deactivate camera capabilities within the cellular telephone.

While the examples depict utilize a boundary that is determined based on data associated with a short-range network, a boundary zone may be determined using long-range networks and policies and features applied based on location within the long-range network. For example, location may be determined by GPS or cellular triangulation and policies applied to devices based on a policy mapping within the cellular network. Policies, such as the feature policy or network policy, may be implemented on a long-range network. In addition, IP-based communications protocols may be implemented that extend beyond the typical range of short-range wireless networks. In one exemplary embodiment, a Wi-Max or IEEE 802.16 network that has a long-range coverage area may be used to implement boundary zones.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
    a set of short-range wireless access points configured to provide a short-range wireless network having a coverage area wherein each access point is configured to communicate with a wireless enabled device within a portion of the coverage area and within a designated access area, the designated access area being defined by boundary data for establishing policy management therein;
    a policy server communicatively coupled with the set of short-range wireless access points; configured to receive the boundary data from a boundary calibration device, the boundary data representing a set of boundary locations, wherein the set of boundary locations is determined by the boundary calibration device collecting data from each of the of access points at each boundary location; configured to determine whether the wireless enabled device is located within the designated access area within the coverage area based on the boundary data; and configured to control the wireless enabled device in accordance with the policy management when the wireless enabled device is located in the designated access area.

2. The system of claim 1, wherein the designated access area is smaller than the coverage area.

3. The system of claim 1, wherein the policy server is configured to control network traffic associated with the wireless enabled device based on whether the wireless enabled device is within the designated access area.

4. The system of claim 1, wherein the policy server is configured to control feature functionality of the wireless enabled device based on whether the wireless enabled device is within the designated access area.

5. The system of claim 1, wherein the policy server determines whether the wireless enabled device is within the designated region by performing a triangulation operation based on the data received from at least three access points.

6. The system of claim 1, wherein the short-range wireless network uses protocols selected from the group consisting of IEEE 802.113 802.15, and 802.16.

7. The system of claim 1, wherein the set of boundary locations is determined by performing a triangulation operation.

8. A method for managing feature functionality of a wireless enabled device, the method comprising:
    determining boundary data of a set of boundary locations based on a location of a boundary calibration device relative to a location of each of a plurality of access points;
    providing the boundary data defining a designated access area within a short-range wireless network coverage area wherein a plurality of short-range access points are configured to communicate within the designated access area defined by boundaries within said coverage area;
    determining whether a wireless enabled device is located within the designated access area based on data communicated by each access point of the plurality of short-range access points and the boundary data; and
    determining a feature policy to be applied to the wireless enabled device based on determining that the wireless enabled device is located within the designated access area.

9. The method of claim 8, further comprising providing the feature policy to the wireless enabled device.

10. The method of claim 9, wherein the feature policy is provided via the short-range wireless network.

11. The method of claim 8, wherein determining whether the wireless enabled device is located within the designated access area further includes comparing the device location to the boundary data.

* * * * *

UNITED STATES PATENT AND TRADEMARK OFFICE
CERTIFICATE OF CORRECTION

| | | |
|---|---|---|
| PATENT NO. | : 7,286,834 B2 | |
| APPLICATION NO. | : 10/890397 | |
| DATED | : October 23, 2007 | |
| INVENTOR(S) | : Edward Walter | |

It is certified that error appears in the above-identified patent and that said Letters Patent is hereby corrected as shown below:

Col. 10, Ln 18-20 should read
-- 6. The system of claim 1, wherein the short-range wireless network uses protocols selected from the group consisting of IEEE 802.11, 802.15, and 802.16. --.

Signed and Sealed this
Third Day of July, 2012

David J. Kappos
*Director of the United States Patent and Trademark Office*